(12) United States Patent
Wang et al.

(10) Patent No.: US 7,876,815 B2
(45) Date of Patent: Jan. 25, 2011

(54) METHODS AND APPARATUS TO QUALIFY A WIRE-PAIR FOR A DIGITAL SUBSCRIBER LINE (DSL) SERVICE

(75) Inventors: Jin Wang, Union City, CA (US); Kapil Shrikhande, Berkeley, CA (US); Raghvendra Gurudath Savoor, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 838 days.

(21) Appl. No.: 11/748,983

(22) Filed: May 15, 2007

(65) Prior Publication Data

US 2008/0285635 A1 Nov. 20, 2008

(51) Int. Cl.
*H04B 1/38* (2006.01)
*H04L 5/16* (2006.01)

(52) U.S. Cl. .................. 375/222; 375/224; 375/225; 375/227; 375/296

(58) Field of Classification Search ......... 375/222–228, 375/296, 297
See application file for complete search history.

(56) References Cited

U.S. PATENT DOCUMENTS

| | | | |
|---|---|---|---|
| 6,002,671 A | 12/1999 | Kahkoska et al. | |
| 6,014,425 A * | 1/2000 | Bingel et al. | 379/26.02 |
| 6,091,713 A | 7/2000 | Lechleider et al. | |
| 6,292,468 B1 | 9/2001 | Sanderson | |
| 6,292,539 B1 * | 9/2001 | Eichen et al. | 379/1.04 |
| 6,366,644 B1 | 4/2002 | Sisk et al. | |
| 6,633,545 B1 | 10/2003 | Milbrandt | |
| 6,643,266 B1 | 11/2003 | Pugaczewski | |
| 6,826,258 B2 | 11/2004 | Afzal | |
| 7,003,078 B2 | 2/2006 | Starr et al. | |
| 7,027,405 B1 | 4/2006 | Khadavi | |
| 7,099,439 B2 | 8/2006 | Luneau | |
| 7,116,760 B2 | 10/2006 | Smith et al. | |
| 2001/0043675 A1 | 11/2001 | Starr | |
| 2004/0028144 A1 * | 2/2004 | Golo | 375/257 |
| 2005/0122916 A1 | 6/2005 | Rubin et al. | |
| 2006/0072722 A1 | 4/2006 | Savoor et al. | |
| 2006/0088141 A1 | 4/2006 | Starr et al. | |
| 2006/0159026 A1 | 7/2006 | Wu et al. | |
| 2006/0159106 A1 | 7/2006 | Slyke et al. | |
| 2006/0159232 A1 | 7/2006 | Jiang et al. | |
| 2006/0176841 A1 * | 8/2006 | Pepper et al. | 370/315 |
| 2007/0036339 A1 | 2/2007 | Cioffi et al. | |
| 2007/0121793 A1 | 5/2007 | Wang et al. | |

(Continued)

OTHER PUBLICATIONS

U.S. Appl. No. 11/857,883 entitled "Digital Subscriber Line (DSL) Diagnostic Tools and Methods to Use the Same", filed Sep. 19, 2007, 40 pages.

(Continued)

*Primary Examiner*—Curtis B Odom
(74) *Attorney, Agent, or Firm*—Hanley, Flight & Zimmerman, LLC

(57) ABSTRACT

Methods and apparatus to qualify a wire-pair for a digital subscriber line (DSL) service are disclosed. An example method comprises modifying a digital subscriber line (DSL) signal received on a wire-pair at a DSL modem to emulate an environmental condition, and qualifying the wire-pair for a DSL service based on a DSL connection rate achieved by the DSL modem during the emulated environmental condition.

27 Claims, 5 Drawing Sheets

U.S. PATENT DOCUMENTS

2007/0208537 A1 9/2007 Savoor et al.
2007/0230667 A1* 10/2007 Warner et al. ............ 379/27.01
2007/0274513 A1* 11/2007 Wang et al. ................. 379/380

OTHER PUBLICATIONS

U.S. Appl. No. 12/043,748, entitled "Methods and Apparatus to Detect Wideband Interference in Digital Subscriber Line (DSL) Systems", filed Mar. 6, 2008, 28 pages.

U.S. Appl. No. 11/542,292 entitled "Method and Apparatus to Develop Management Rules for Qualifying Broadband Services", filed Oct. 3, 2006, 64 pages.

U.S. Appl. No. 11/751,353 entitled "Methods and Apparatus to Characterize a Digital Subscriber Line (DSL) Subscriber Loop", filed May 30, 2007, 52 pages.

U.S. Appl. No. 12/006,299 entitled "System and Method for Evaluating and Troubleshooting a Digital Subscriber Line System", filed Jan. 2, 2008, 14 pages.

U.S. Appl. No. 11/972,370 entitled "System and Method for Trouble Detection, Isolation, and Management", filed Jan. 10, 2008, 30 pages.

U.S. Appl. No. 11/799,109 entitled "System and Method of Identifying a Location Associated With a Source of Data Communication..", filed Apr. 30, 2007, 24 pages.

U.S. Appl. No. 11/708,646 entitled "Method and System for Testing a Communication Network", filed Feb. 20, 2007, 24 pages.

* cited by examiner

METHODS AND APPARATUS TO QUALIFY A WIRE-PAIR FOR A DIGITAL SUBSCRIBER LINE (DSL) SERVICE

FIELD OF THE DISCLOSURE

This disclosure relates generally to digital subscriber line (DSL) services and/or systems and, more particularly, to methods and apparatus to qualify a wire-pair for a DSL service.

BACKGROUND

Communication systems using digital subscriber line (DSL) technologies are commonly utilized to provide Internet related services to subscribers, such as, for example, homes and/or businesses (also referred to herein as users, customers and/or customer-premises). DSL technologies enable customers to utilize telephone lines (e.g., ordinary twisted-pair copper telephone lines used to provide Plain Old Telephone System (POTS) services) to connect the customer to, for example, a high data-rate broadband Internet network, broadband service and/or broadband content. For example, a communication company and/or service provider may utilize a plurality of modems (e.g., a plurality of DSL modems) implemented by a DSL Access Multiplexer (DSLAM) at a central office (CO) to provide DSL communication services to a plurality of modems located at respective customer-premises. In general, a CO DSL modem receives broadband service content from, for example, a backbone server and forms a digital downstream DSL signal to be transmitted to a customer-premises DSL modem. Likewise, the central office DSL modem receives an upstream DSL signal from the customer-premises DSL modem and provides the data transported in the upstream DSL signal to the backbone server.

In many instances, two or more DSL modems at different customer-premises utilize respective twisted-pair copper telephone lines that are bundled together (e.g., contained within) in a distribution cable (e.g., a binder). Because the telephone lines are bundled together, the two or more DSL modems may cause and/or create crosstalk noise for each other. Moreover, the characteristics of the twisted-pair copper telephone lines are susceptible and/or dependent upon, for example, ambient temperature, heat loading and/or moisture. Crosstalk and/or environmental conditions may affect the DSL connection rate achievable by a DSL modem.

DETAILED DESCRIPTION

Figure 1:
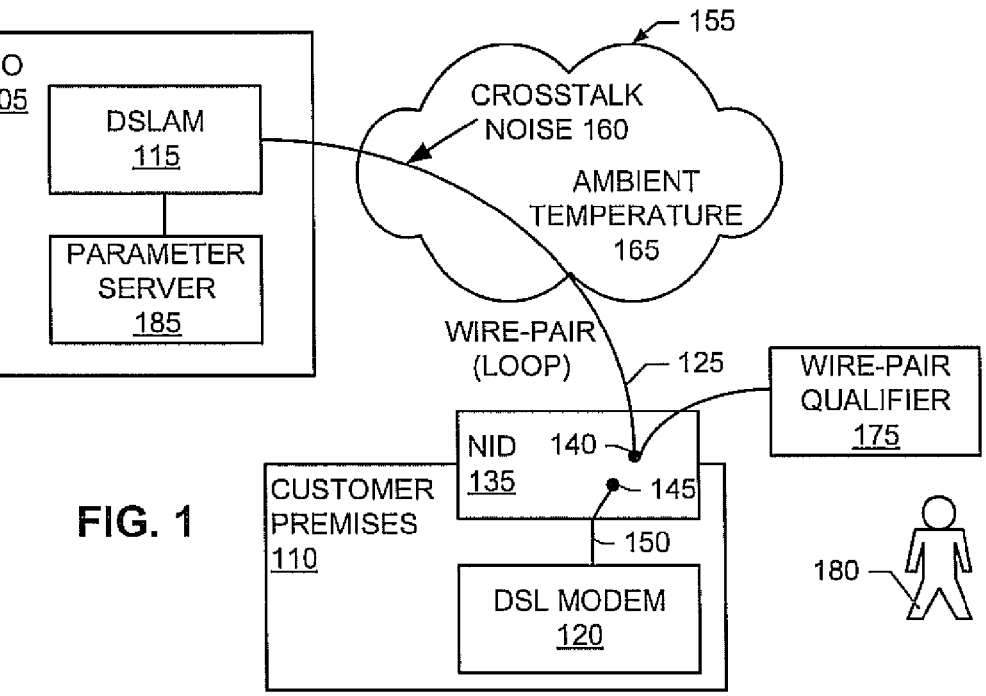
FIG. 1 is a schematic illustration of an example digital subscriber line (DSL) communication system constructed in accordance with the teachings of the invention.

Methods and apparatus to qualify a wire-pair for a digital subscriber line (DSL) service are disclosed. A disclosed example method includes modifying a DSL signal received on a wire-pair at a DSL modem to emulate an environmental condition, and qualifying the wire-pair for a DSL service based on a DSL connection rate achieved by the DSL modem during the emulated environmental condition. A disclosed example method of installing a DSL service for a subscriber includes connecting a wire-pair qualifier to a first end of a wire-pair, a second end of the wire-pair to be connected a first DSL modem, wherein the loop qualifier is to measure a DSL connection rate achieved by the first DSL modem while the wire-pair qualifier emulates an environmental condition, and installing a second DSL modem at the first end of the wire-pair when the measured DSL connection rate is at least equal to a threshold. A disclosed example apparatus includes an environment emulator to emulate an environmental condition, and a DSL modem to be communicatively coupled to a wire-pair via the environmental emulator to detect a DSL connection rate to qualify the wire-pair for a DSL service.

In the interest of brevity and clarity, throughout the following disclosure references will be made to connecting a digital subscriber line (DSL) modem and/or a DSL communication service to a customer. However, it will be readily apparent to persons of ordinary skill in the art that connecting a DSL modem to a customer involves, for example, connecting a first DSL modem operated by a communications company (e.g., a central office (CO) DSL modem implemented by a DSL access multiplexer (DSLAM)) to a second DSL modem located at, for example, a customer-premises (e.g., a home and/or place of business owned, leased and/or operated by a customer) via a twisted-pair telephone line (i.e., a wire-pair). The customer-premises (e.g., the second) DSL modem may be further connected to other communication and/or computing devices (e.g., a personal computer, a set-top box, etc.) that the customer uses and/or operates to access a service (e.g., Internet access, Internet protocol (IP) Television (TV), etc.) via the CO DSL modem, the customer-premises DSL modem, the wire-pair and the communications company.

Moreover, while methods and apparatus to qualify a wire-pair for a DSL service are described herein, persons of ordinary skill in the art will readily appreciate that the example methods and apparatus may additionally or alternatively be used to qualify other wires and/or cables for other communication services. Other example wires and/or cables include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks. Further, while the following descriptions reference the qualification of wire-pairs to deliver and/or support a DSL connection rate from a central office to a customer-premises (i.e., downstream), the example methods and/or apparatus may also be used to qualify a wire-pair to deliver and/or support DSL connection rates from a customer-premises to a central office (upstream).

FIG. 1 illustrates an example DSL communication system in which a central office (CO) 105 provides data and/or communication services (e.g., telephone services, Internet services, data services, messaging services, instant messaging services, electronic mail (email) services, chat services, video services, audio services, gaming services, etc.) to one or more customer-premises, one of which is designated at reference numeral 110. To provide DSL communication services to the customer-premises 110, the example CO 105 of FIG. 1 includes any number and/or type(s) of DSLAMs (one of which is designated at reference numeral 115) and the example customer-premises 110 includes any type of DSL modem 120. The example DSLAM 115 of FIG. 1 includes and/or implements one or more CO DSL modems (not shown), for respective ones of customer-premises locations. The example DSLAM 115, the CO DSL modems and/or the example DSL modem 120 of FIG. 1 may be implemented, for example, in accordance with the ITU-T G.993.x family of standards for very high-speed DSL (VDSL).

In the illustrated example of FIG. 1, the DSLAM 115 provides the DSL service to the DSL modem 120 at the customer-premises 110 via a wire-pair 125. Wire-pairs are sometimes also referred to in the industry as "loops." While throughout this disclosure reference is made to the example wire-pair 125 of FIG. 1, persons of ordinary skill in the art will readily appreciate that a wire-pair (e.g., the example wire-pair 125) used to provide a DSL service to a customer-premises location (e.g., the location 110) may include and/or be constructed from one or more segments of twisted-pair telephone wire (e.g., a combination of a feeder one (F1) cable, a distribution cable, a drop cable, and/or customer-premises wiring), terminals and/or distributions points (e.g., a serving area interface (SAI), a serving terminal, a vault and/or a pedestal). Such segments of twisted-pair telephone wire may be spliced and/or connected end-to-end, and/or may be connected at only one end thereby creating one or more bridged-taps. Regardless of the number, type(s), gauge(s) and/or topology of twisted-pair telephone wires used to construct the example wire-pair 125, it will be referred to herein in the singular form but it will be understood to refer to one or more twisted-pair telephone wire segments and may include one or more bridged taps.

As commonly used in the industry, the term "network demarcation point" denotes a location where cabling and/or equipment associated with a service provider (e.g., associated with the CO 105 and/or the DSLAM 115) is physically, electrically and/or communicatively coupled to cabling and/or equipment associated with a customer-premises, a subscriber, a user and/or a customer (e.g., the example DSL modem 120). Such subscriber cabling and/or equipment is often owned by the customer but may, in some instances, be owned, leased and/or otherwise provided by the service provider. Typically a network demarcation unit (e.g., a network interface device NID 135) is located at the network demarcation point (e.g., on the outside of an exterior wall of the customer-premises 110) to implement the physical, electrical and/or communicative coupling between the subscriber and service provider sides of the network demarcation point. The example NID 135 of FIG. 1 contains a first set of screw terminals, jacks and/or jumpers 140 to couple the wire-pair 125 to the NID 135, and contains a second set of screw terminals, jacks and/or jumpers 145 to couple subscriber cabling 150 to the NID 135. In such examples, the NID 135 couples the two sets of cabling 125 and 150 across the NID 135.

In some examples, to reduce and/or eliminate the effects of telephone wiring (not shown) within the customer-premises 110, the example DSL modem 120 is located and/or implemented at and/or within the NID 135. However, the DSL modem 120 need not be implemented at and/or within the NID 135. For example, the DSL modem 120 could be implemented elsewhere within the customer-premises 110. Alternatively, the DSL modem 120 may be partially implemented within the NID 135. For example, a device (e.g., a POTS splitter) may be installed and/or implemented within the NID 135 to isolate the effects of telephone wiring and/or telephones (not shown) located in the customer-premises 110 from the DSL modem 120.

As illustrated in FIG. 1, the example wire-pair 125 is subjected to one or more environmental conditions 155 that affect all or any portion(s) of the wire-pair 125. The example environmental conditions 155 of FIG. 1 may affect the DSL connection rate(s) supportable by the wire-pair 125 over time after an initial DSL service is provisioned. These effects are referred to as the conditional variability of the DSL service. Example environmental conditions 155 include, but are not limited to, crosstalk noise 160 introduced by other DSL modems (or the same and/or different type) that share a common telephone wire segment (e.g., a distribution cable), an ambient temperature 165, one or more radio frequency (RF) interferers, impulsive noise and/or background noise. While the example wire-pair qualifiers 175 described herein are used to emulate effects due to ambient temperature 165 and/or crosstalk noise 160, persons of ordinary skill in the art will readily appreciate that any or all of the wire-pair qualifiers 175 could be used to emulate any environmental conditions 155. For example, the wire-pair qualifiers 175 could additionally or alternatively emulate impulse noise differences between time-of-day when a DSL modem is installed and evenings when more home appliances are used, and/or emulate varying RF interference sources. The example crosstalk noise 160 of FIG. 1 is dependent upon the number and/or type(s) of the other DSL modems, and/or the length(s) of the common distribution cable segment(s) shared by the DSL modems. Thus, the crosstalk noise 160 experienced by the example DSL modem 120 may change over time as other DSL modems are installed, de-installed, powered-on and/or powered-off. For example, as new DSL services are offered and/or installed in a neighborhood, the crosstalk noise 160 experienced on the day the DSL modem 120 is installed may be less than the crosstalk noise 160 experienced days, weeks and/or months later. Thus, the DSL connection rate(s) achievable by the DSL modem 120 may undesirably drop and/or decrease in time and, in fact, may drop below the minimum DSL connection rate required for a particular DSL service.

Figure 5:
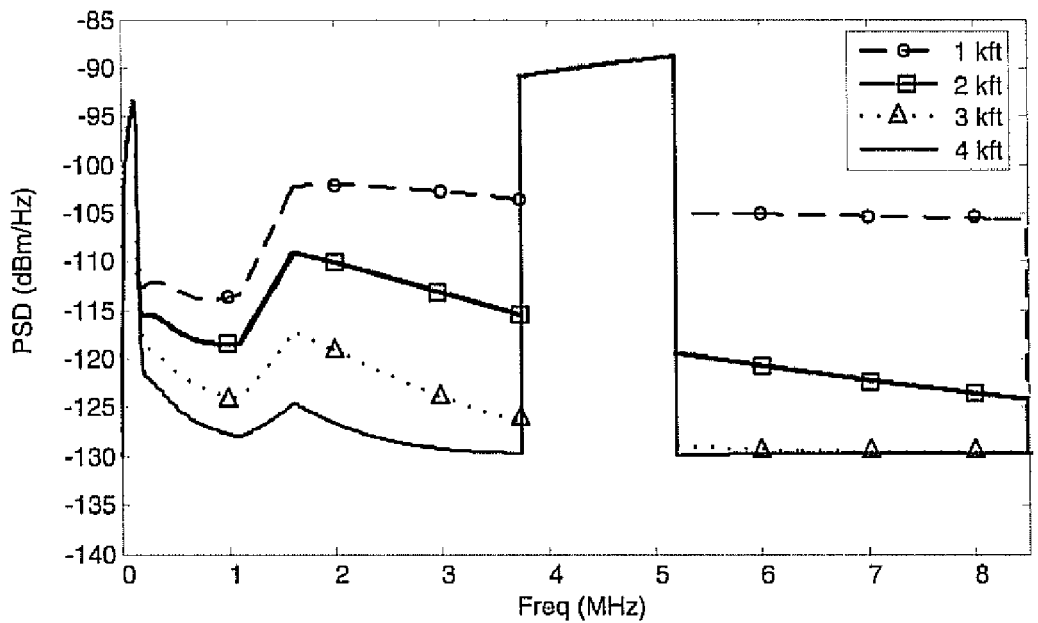
FIG. 5 is a graph representative of example crosstalk noises as a function of loop length.

FIG. 5 is a graph illustrating example crosstalk noises for various lengths of the example wire-pair 125 of FIG. 1. The example curves of FIG. 5 illustrate crosstalk in a crosstalk scenario where six other VDSL modems are operating within the same distribution cable (e.g., binder) as the DSL modem 120. The curves are computed using the one percent (1%) worst-case crosstalk model. The 1% worst-case crosstalk model includes near-end crosstalk (NEXT), and far-end crosstalk (FEXT). NEXT represents the crosstalk introduced by other DSL modems transmitting at other customer-premises locations, and FEXT represents the crosstalk introduced by other DSL modems transmitting at the CO 105. NEXT and FEXT may be mathematically expressed as:

$$\text{NEXT}(f) = K_{NEXT} \cdot (N/49)^{0.6} \cdot f^{1.5} \cdot P$$

$$\text{FEXT}(f) = K_{FEXT} \cdot (N/49)^{0.6} \cdot f^2 \cdot L \cdot P \cdot H(f) \qquad \text{EQN (1)}$$

where $K_{NEXT}=10^{-13}$, $K_{FEXT}=9\times10^{-20}$, f is frequency, P is the maximum transmitting power spectral density (PSD) (e.g., as defined in the ITU-T G.993x family of standards), L is the length of the wire-pair 125, H(f) is the signal attenuation of the wire-pair 125 at frequency f, and N is the number of DSL modems creating crosstalk (e.g., six). The example crosstalk noise curves of FIG. 5 are smoothed to facilitate the emulation and/or injection of crosstalk noise by an example wire-pair qualifier 175.

Returning to FIG. 1, the characteristics (e.g., length, electrical characteristics and/or attenuation) of the example wire-pair 125 of FIG. 1 may depend upon, for example, the ambient temperature 165. For example, as the ambient temperature 165 rises (e.g., on a summer day and/or due to heat loading from the sun), the length of the wire-pair 125 may increase and its electrical characteristics changes. Likewise, as the ambient temperature 165 falls, the length of the wire-pair 125 may decrease and its electrical characteristics changes. As the ambient temperature 165 of the wire-pair 125 increases, its signal attenuation also increases resulting in a drop in the DSL connection rate achievable by the DSL modem 120. Aerial drop cables are known to be particularly susceptible to the ambient temperature 165. Thus, the DSL connection rate(s) achievable by the DSL modem 120 may vary day-to-day, week-to-week, and/or within a day as the ambient temperature 165 changes.

Figure 6:
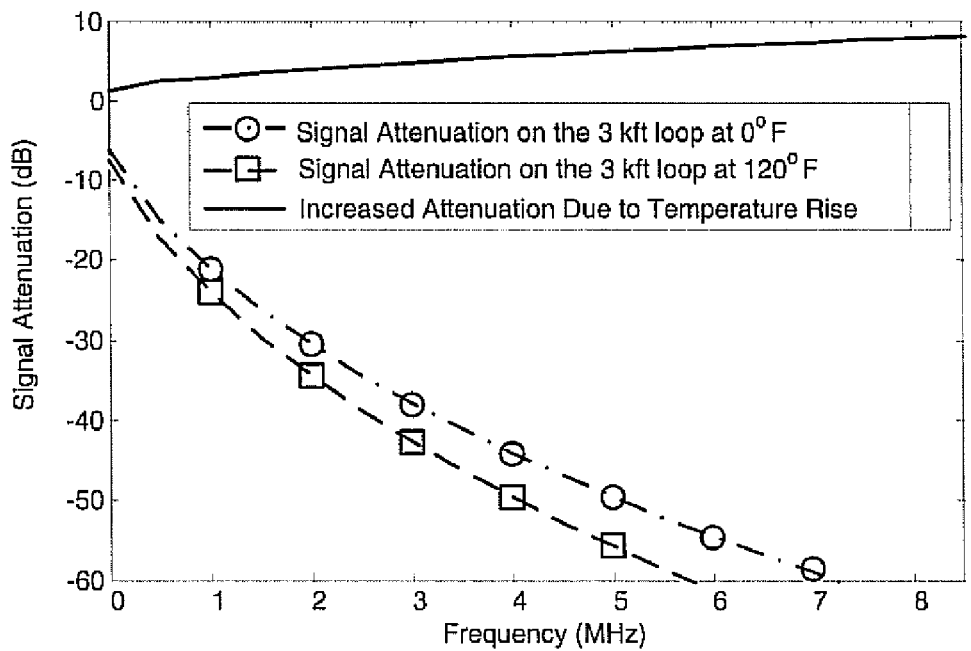
FIG. 6 is a graph representative of example signal attenuations as a function of ambient temperature.

FIG. 6 is a graph illustrating example signal attenuations for various ambient temperatures 165. The increased signal attenuation due to a temperature increase may be computed using the following mathematical expression:

$$\text{ATTN}(f)=L\cdot[\alpha(T_d)-\alpha(T_o)], \quad \text{EQN (2)}$$

where L is the length of the wire-pair 125 in thousands of feet (kft), $\alpha(T)$ is the insertion loss of the wire-pair 125 per kft at temperature T, $T_d$ is a desired ambient temperature to be modeled and/or emulated, and $T_o$ is the current ambient temperature 165. For example, if the ambient temperature on an installation date is 0° Fahrenheit (F) and the expected highest temperature is expected to be 120° F., the graph of FIG. 6 illustrates the expected increase in signal attenuation due to the temperature change. The example curves of FIG. 6 are smoothed to facilitate the introduction and/or application of additional signal attenuation by the example wire-pair qualifier 175.

Returning to FIG. 1, to qualify the wire-pair 125 for a desired DSL service (e.g., a VDSL service requiring a downstream DSL connection rate of at least 25 Million bits per second (Mbps)), the example DSL communication system of FIG. 1 includes a wire-pair qualifier 175. The example wire-pair qualifier 175 of FIG. 1 is a battery-operated portable and/or handheld device useable by a technician, installer and/or service person 180 to test the capability of the wire-pair 125 to support the desired DSL service, and may be used outside and/or within the customer-premises 110. The example wire-pair qualifier 175 is connected to the wire-pair 125 at the example NID 135, and is used to qualify the wire-pair 125 for the desired DSL service under expected nominal, worst-case and/or typical environmental conditions 155. For example, the wire-pair qualifier 175 can measure, estimate and/or determine current environmental conditions 155, and then emulate, mimic and/or simulate a desired set of environmental conditions 155 (e.g., an ambient temperature 165 corresponding to the expected hottest day of the year, and/or crosstalk noise 160 corresponding to the number of DSL modems expected to be installed in a neighborhood and, thus, representing a potentially worst case crosstalk noise scenario). By emulating a desired set of environmental conditions, the wire-pair qualifier 175 can substantially reduce the likelihood of false positives (e.g., indicating that DSL service can be provided by a given wire-pair 125 when, in fact, it can not be sustained) and/or false negatives (e.g., indicating DSL service can not be provided over a given wire-pair 125 when, in fact, it can be provided) that occur when an attempt to install and/or provision DSL services to customer-premises locations is made and/or considered. For example, if the wire-pair 125 is currently experiencing environmental conditions 155 that are better than worst-case conditions, the emulation of worst-case conditions by the wire-pair qualifier 175 reduces the likelihood that the DSL connection rate for the wire-pair 125 later falls below the minimum DSL connection rate required for the DSL service thereby reducing the occurrence of false positives. Likewise, because the wire-pair qualifier 175 measures, estimates and/or determines current environmental conditions 155 and only emulates the additional conditions necessary to represent a desired worst-case scenario, use of the wire-pair qualifier 175 to qualify of the wire-pair 125 can substantially reduce the likelihood of a DSL service being disqualified to a customer-premises 110 due to, for example, too high of a target noise margin being assumed and/or configured given the wire-pair 125 already is experiencing near worst-case environmental conditions 125 thereby reducing the occurrence of false negatives.

The wire-pair qualifier 175 of FIG. 1 can emulate, mimic and/or simulate environmental conditions 155 by, for example, modifying DSL signals received by and/or at the wire-pair qualifier 175 from the DSLAM 115. For instance, a potential worst-case scenario can be emulated by applying additional signal attenuation to received DSL signals to emulate a potential increase in wire-pair length due to an increase in temperature from a current ambient temperature 165 to an expected worst-case ambient temperature. Additionally or alternatively, the wire-pair qualifier can inject additional crosstalk noise into the received DSL signals to emulate the installation of additional DSL modems at a predicted worst-case future level. Thus, by emulating particular environmental conditions 155, the wire-pair qualifier 175 can test, determine and/or verify the DSL connection rate that the DSL modem 120 should be able to support as the environmental conditions 155 change. Therefore, the wire-pair qualifier 175 can qualify the wire-pair 125 for the desired DSL service over the expected range of conditions.

To determine DSL connection rates, the example wire-pair qualifier 175 of FIG. 1 implements and/or includes a DSL modem that may be substantially similar to the DSL modem 120. Additionally or alternatively, as described below in connection with FIGS. 2 and 3, the wire-pair qualifier 175 may utilize and/or be communicatively coupled to a separately implemented DSL modem to determine DSL connection rates.

In the illustrated example of FIG. 1, when the wire-pair qualifier 175 is connected to the wire-pair 125, the example DSL modem 120 is disconnected from the wire-pair 125. For example, the example person 180 (e.g., a technician) can access the terminals 140 and/or 145 to disconnect the DSL modem 120 from the wire-pair 125 and to connect the wire-pair qualifier 175 to the wire-pair 125. However, as described below in connection with FIGS. 2 and 3, the wire-pair qualifier 175 may be used, employed and/or implemented in other ways. While the example wire-pair qualifier 175 of FIG. 1 is a portable and/or handheld device which may be carried and used by a service technician, the wire-pair qualifier 175 may have any form factor and/or use any power source and/or supply. An example manner of implementing the example wire-pair qualifier 175 of FIG. 1 is described below in connection with FIG. 4.

The example wire-pair qualifier 175 of FIG. 1 may be used when evaluating the wire-pair 125 for DSL service, for example, during a sales call, during an attempted installation of a desired DSL service to the customer-premises 110 and/or to the DSL modem 120, and/or when upgrading a DSL service to the customer-premises 110 and/or to the DSL modem 120. For example, when a customer associated with the customer-premises 110 requests that a DSL service be installed, the person (e.g., a technician or other field service personnel) 180 may: 1) connect the wire-pair 125 to the DSLAM 115, 2) connect the wire-pair qualifier 175 to the wire-pair 125 at the NID 135, 3) operate the wire-pair qualifier 175 to determine the DSL connection rate supported by the wire-pair 125 for a desired set of environmental conditions 155, 4) if the DSL connection rate determined by the wire-pair qualifier 175 equals or exceeds the DSL connection rate required for a desired DSL service across the full range of simulated conditions, the person 180 continues with the installation and/or configuration of the DSL modem 120 at the NID 135 and/or within the customer-premises 110, and 5) if the DSL connection determined by the wire-pair qualifier 175 is less than the DSL connection rate required for a desired DSL service across at least some portion(s) of the emulated conditions, the person 180 cancels and/or stops the installation of the DSL service to the customer-premises 110.

While the example wire-pair qualifier 175 of FIG. 1 may operate as a stand alone device, the wire-pair qualifier 175 may also interact with a parameter server 185 located at and/or associated with the example CO 105. The example parameter server 185 of FIG. 1 collects, receives and/or otherwise obtains information concerning DSL services, wire-pairs, DSL modems, DSL connection rates, crosstalk noise, error rates, etc., and uses the same to predict environmental conditions 155 that the wire-pair 125 may be expected to experience. For example, the parameter server 185 may be configured to automatically collect information concerning DSL connections each time a new DSL connection is (re-) established. In some examples, the wire-pair qualifier 175 may, during the qualification of the wire-pair 125, consult with the parameter server 185 to identify the environmental conditions 155 that should be emulated (e.g., the amount of attenuation that should be applied and/or the amount of additional crosstalk that may be applied) and/or to obtain a noise margin to be utilized when determining a DSL connection rate. When consulting with the parameter server 185, the wire-pair qualifier 175 may provide information regarding the wire-pair 125 (e.g., before and after additional attenuation and/or crosstalk is applied) such as, but not limited to, estimated loop length, DSL connection rate, signal attenuation, signal-to-noise ratios, bit allocations, etc. Such information may be used by the example parameter server 185 of FIG. 1 to more accurately and/or precisely determine the environmental conditions 155 to be emulated by the wire-pair qualifier 175 during qualification of the wire-pair 125. For example, because the parameter server 185 is centrally located and/or accessible, it may have more computational resources than the wire-pair qualifier 175, and it has access to additional information concerning additional wire-pairs served by and/or from the CO 105. The example wire-pair qualifier 175 of FIG. 1 interacts with the parameter server 185 via the wire-pair 125 and/or the DSLAM 115 (i.e., via a DSL connection established by the wire-pair qualifier 175). While the example parameter server 185 of FIG. 1 is associated with the example CO 105, not every CO 105 need include and/or implement a parameter server 185. For example, the parameter server 185 may be shared by any number of central offices.

Figure 2:
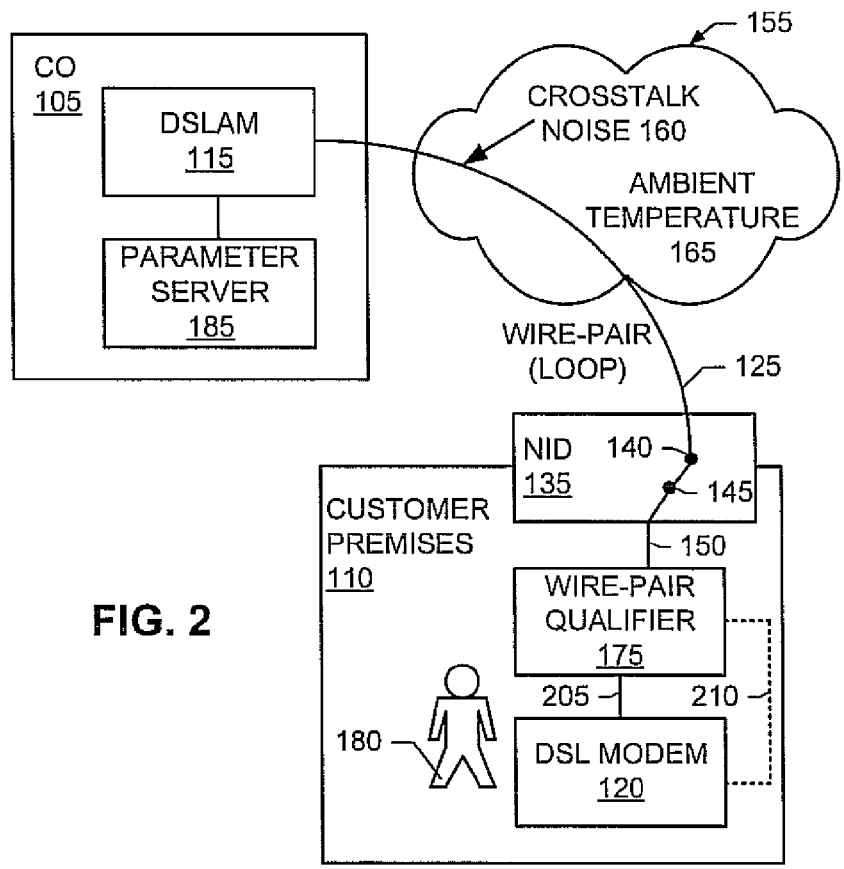
FIGS. 2 and 3 represent additional example DSL communication systems constructed in accordance with the teachings of the invention.
Figure 3:
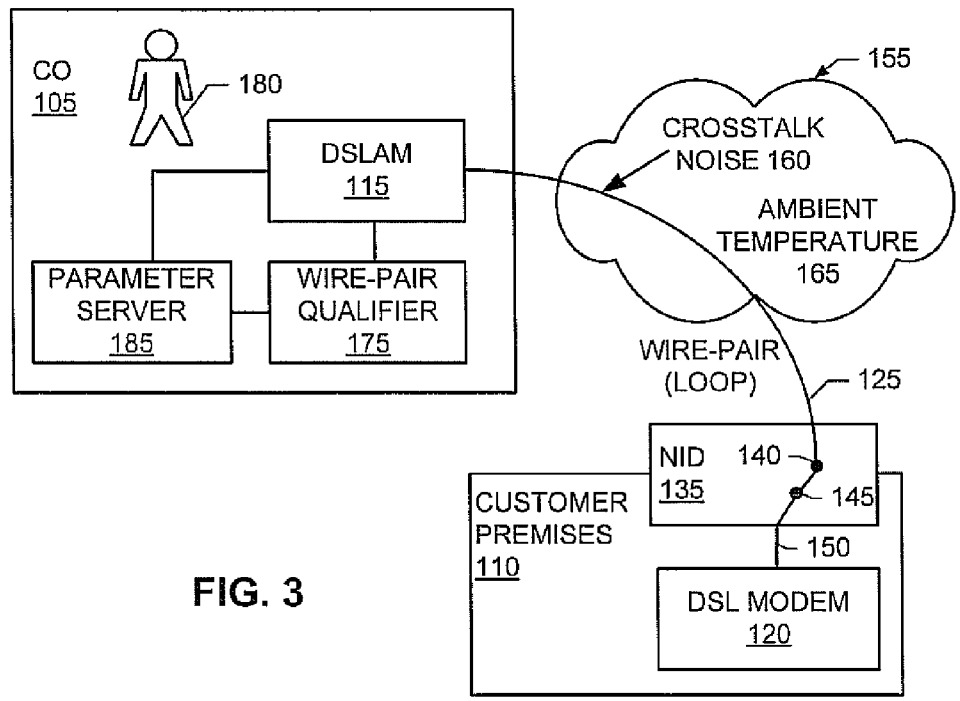

FIGS. 2 and 3 illustrate additional example uses and/or implementations of the example wire-pair qualifier 175. Because portions of the illustrated examples of FIGS. 2 and 3 are substantially similar, analogous and/or identical to portions of the illustrated example of FIG. 1, a description of those structures is not repeated here. Instead, the interested reader is referred back to the descriptions presented above in connection with FIG. 1 for a complete description of those numbered elements. To facilitate this process, like members are illustrated with like reference numerals in FIGS. 1, 2 and 3. The portions of the illustrated examples of FIGS. 2 and 3 which differ from the example of FIG. 1 are described below.

In the illustrated example of FIG. 2, the example wire-pair qualifier 175 is utilized at and/or within the customer-premises 110. However, instead of the wire-pair qualifier 175 implementing and/or including a DSL modem, the wire-pair qualifier 175 uses and/or is communicatively coupled to the DSL modem 120 and the DSL modem 120 is communicatively coupled and/or remains communicatively coupled to the wire-pair 125 at the NID 135. The example wire-pair qualifier 175 of FIG. 2 is situated so as to be able to emulate a desired set of environmental conditions 155. For example, the input cable 150 to the DSL modem 120 may be removed from the DSL modem 120 and plugged into the wire-pair qualifier 175, and then an output cable 205 from the wire-pair qualifier 175 may be plugged into the input of the DSL modem 120. To allow the wire-pair qualifier 175 to interact with the DSL modem 120, another cable 210 from the wire-pair qualifier 175 may be communicatively directly and/or indirectly coupled to a network port of the DSL modem 120. The example network cable 210 of FIG. 2 may be used by the wire-pair qualifier 175 to obtain DSL connection information from the DSL modem 120 such as, but not limited to, DSL connection rate, estimated loop length, signal attenuation values, signal to noise values, bit allocations, etc. The network cable 210 may also be used by the wire-pair qualifier 175 to communicate with the parameter server 185 via the DSL modem 120, the wire-pair 125 and/or the DSLAM 115.

In the illustrated example of FIG. 3, the wire-pair qualifier 175 is utilized and/or implemented at and/or within the example CO 105. For example, the wire-pair qualifier 175 may be communicatively coupled to the DSLAM 115 and/or be configurable to emulate environmental conditions 155 by modifying DSL signals transmitted by and/or received by the DSLAM 115. Because the loop qualifier 175 is communicatively coupled to the DSLAM 115, the wire-pair qualifier 175 need not include a DSL modem. Additionally or alternatively, the person 180 may skip connecting the wire-pair 125 to the DSLAM 115, and instead connect the wire-pair qualifier 175 directly to the wire-pair 125 such that the wire-pair qualifier 175 may be operated substantially analogously to that described above in connection with FIG. 1, albeit at the CO 105 rather than from the customer-premises 110. For example, if the wire-pair qualifier 175 modifies DSL signals transmitted by the DSLAM 115, the DSL modem 120 may be used to measure and/or determine a DSL connection rate achievable by the DSL modem 120 under different environmental conditions 155. The example wire-pair qualifier 175 of FIG. 3 is communicatively coupled to the DSL modem 120 via the DSLAM 115, the wire-pair 125 and/or the parameter server 185.

While the example wire-pair qualifiers 175 of FIGS. 1-3 are controlled by a nearby person 180, any or all of the example wire-pair qualifiers 175 may be remotely controllable. For example, the wire-pair qualifier 175 of FIG. 3 could be controlled over a communication path coupling the wire-pair qualifier 175 to, for example, a customer service location, a customer support location, and/or an operations and support location.

Figure 4:
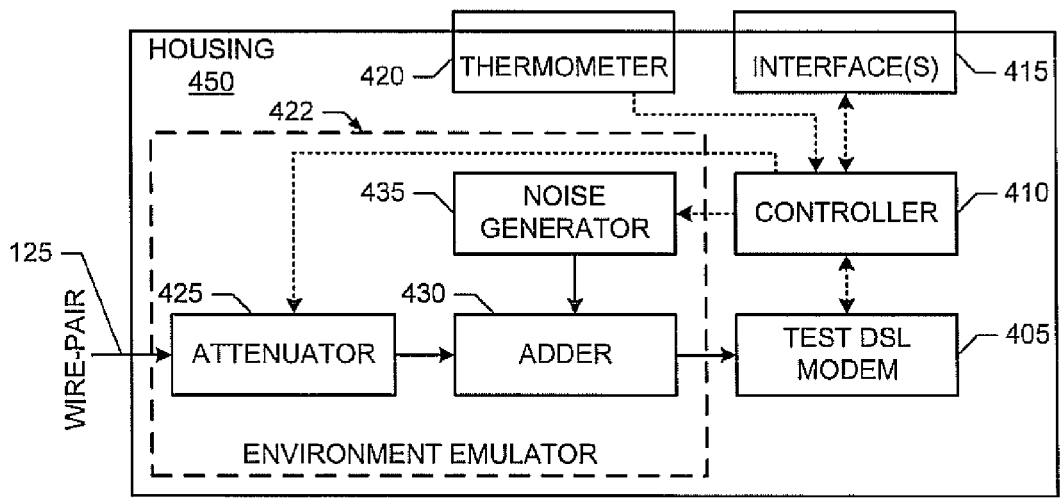
FIG. 4 illustrates an example manner of implementing any or all of the example wire-pair qualifiers of FIGS. 1-3.

FIG. 4 illustrates an example manner of implementing any or all of the example wire-pair qualifiers 175 of FIGS. 1-3. To measure DSL connection rates, the example wire-pair qualifier 175 of FIG. 4 includes a DSL modem 405. The example DSL modem 405 of FIG. 4 implements one or more types of DSL modems such as in accordance with the ITU-T G.993x family of standards for VDSL modems and/or the ITU-T G.992x family of standards for asymmetric DSL (ADSL) modems.

To direct the operations of the example wire-pair qualifier 175 of FIG. 4, the wire-pair qualifier 175 includes any type of controller 410. The example controller 410 of FIG. 4 may be one or more of any of any type of processors such as, for example, a microprocessor, a microcontroller, a processor core, a digital signal processor (DSP), a DSP core, an advanced reduced instruction set computing (RISC) machine (ARM) processor, etc. The example controller 410 executes coded instructions which may be present in a memory (not shown) of the controller 410 (e.g., within a random-access memory (RAM) and/or a read-only memory (ROM)) and/or within an on-board memory of the controller 410. For example, the example coded instructions of FIG. 8 may be executed by the controller 410 to direct the wire-pair qualifier 175 to qualify a wire-pair for a DSL service.

To allow a person to operate the example wire-pair qualifier 175 of FIG. 4, the wire-pair qualifier 175 of FIG. 4 includes any number and/or type(s) of interfaces 415. Example interface(s) 415 include, but are not limited to, any number of button(s), key(s), keypad(s), screen(s), display(s), light emitting diode(s), etc. Additionally or alternatively, the example interface 415 of FIG. 4 may be implemented and/or provided by an operating system executed by the example controller 410. For example, if a wire-pair qualifier 175 is implemented by, within and/or in conjunction with a portable computing device (e.g., a laptop and/or personal digital assistant), the interfaces 410 may be implemented by the portable computing device and/or an operating system executing on the controller 410. The interface(s) 415 may be used to configure the wire-pair qualifier 175 (e.g., to define desired environmental conditions 155 to be emulated), to initiate wire-pair qualification, and/or to read the results of the wire-pair qualification (e.g., the DSL connection rate for the configured environmental conditions 155).

To measure an ambient temperature, the example wire-pair qualifier 175 of FIG. 4 includes any type of thermometer 420. The example thermometer 420 of FIG. 4 is used to measure and/or provide an ambient temperature to the example controller 410, and may be contained within the wire-pair qualifier 175 and/or may be electrically coupled to the wire-pair qualifier 175 via any type of cable.

To emulate a desired set of environmental conditions 155, the example wire-pair qualifier 175 of FIG. 4 includes an environment emulator 422. Using any method(s), algorithm(s), logic, circuit(s) and/or device(s), the environment emulator 422 of FIG. 4 is controllable by the example controller 410 to modify signals (e.g., DSL signals) received on the wire-pair 125 to emulate a particular set of environmental conditions 155.

The example environment emulator 422 of FIG. 4 includes an attenuator 425, a noise generator 430 and an adder 435. The example attenuator 425 of FIG. 4 is any type of adjustable and/or controllable attenuator that is configurable to apply a desired attenuation to signals (e.g., DSL signals) received on the wire-pair 125. The attenuation (including no attenuation) applied by the attenuator 425 is controlled by the controller 410 to achieve an aspect of the desire environmental emulation.

The example noise generator 435 of FIG. 4 is any type of programmable noise generator that is configurable to generate a desired level of noise having a desired spectral shape and/or desired frequency characteristics. The noise generated by the example noise generator 435 (including no noise) is controlled by the controller 410 to achieve an aspect of the desired environmental emulation. The example adder 430 of FIG. 4 adds the noise generated by the noise generator 435 to signals received on the wire-pair 125 and (possibly) attenuated by the attenuator 425.

By controlling the example attenuator 425, the example noise generator 435 and/or the example adder 430 and/or, more generally, the example environment emulator 422, the example controller 410 of FIG. 4 can emulate a desired set of environmental conditions 155. For example, the controller 410 can configure the attenuator 425 to not attenuate received signals, disable the noise generator 435, and then use the DSL modem 405 to determine one or more parameters of the wire-pair 125 (e.g., DSL connection rate, estimated loop length, signal attenuation, ambient temperature 165, crosstalk noise 160, etc.) under current environmental conditions 155. Based on the one or more measured parameters, the controller 410 can determine the attenuation and/or additional crosstalk noise to be applied and/or injected to emulate a desired set of environmental conditions 155. The mathematical expression of EQN (2) may be used to determine the amount of additional attenuation that should be applied based upon the current ambient temperature 165, a temperature to be emulated, and an estimated length of the wire-pair 125. The additional crosstalk noise to be injected may be determined by computing a difference of the crosstalk noise measured by the DSL modem 405 and a desired crosstalk noise calculated using EQN (1). The attenuator 425 and/or the noise generator 435 can then be configured to emulate the desired environmental conditions 155, and the DSL modem 405 can then be used to determine the DSL connection rate under the desired set of environmental conditions 155.

The example wire-pair qualifier 175 of FIG. 4 is contained and/or implemented within a housing 450. The example housing 450 of FIG. 4 has a form factor of a battery-powered portable and/or handheld device. However, the example housing 450 may have other form factors. For example, the housing 450 may be a rack mountable device suitable for use and/or installation with a central office and/or DSLAM. Additionally or alternatively, the housing 450 may have a form factor suitable for mechanical and/or electrical connection to a portable computing device such as a laptop computer and/or personal digital assistant.

While an example manner of implementing any or all of the example wire-pair qualifiers 175 of FIGS. 1-3 has been illustrated in FIG. 4, one or more of the elements, processes and/or devices illustrated in FIG. 4 may be combined, divided, re-arranged, omitted, eliminated and/or implemented in any other way. For example, the example environment emulator 422, the example attenuator 425, the example adder 430 and/or the example noise generator 435 may be implemented by and/or within the example DSL modem 405. Further, the DSL modem 405, the example controller 410, the example interfaces 415, the example environment emulator 422, the example attenuator 425, the example adder 430, the example noise generator 435 and/or, more generally, the example wire-pair qualifier 175 may be implemented by hardware, software, firmware and/or any combination of hardware, software and/or firmware. Further still, the example wire-pair qualifier 175 may include one or more elements, processes and/or devices in addition to, or instead of, those illustrated in FIG. 4, and/or may include more than one of any or all of the illustrated elements, processes and devices.

Figure 7:
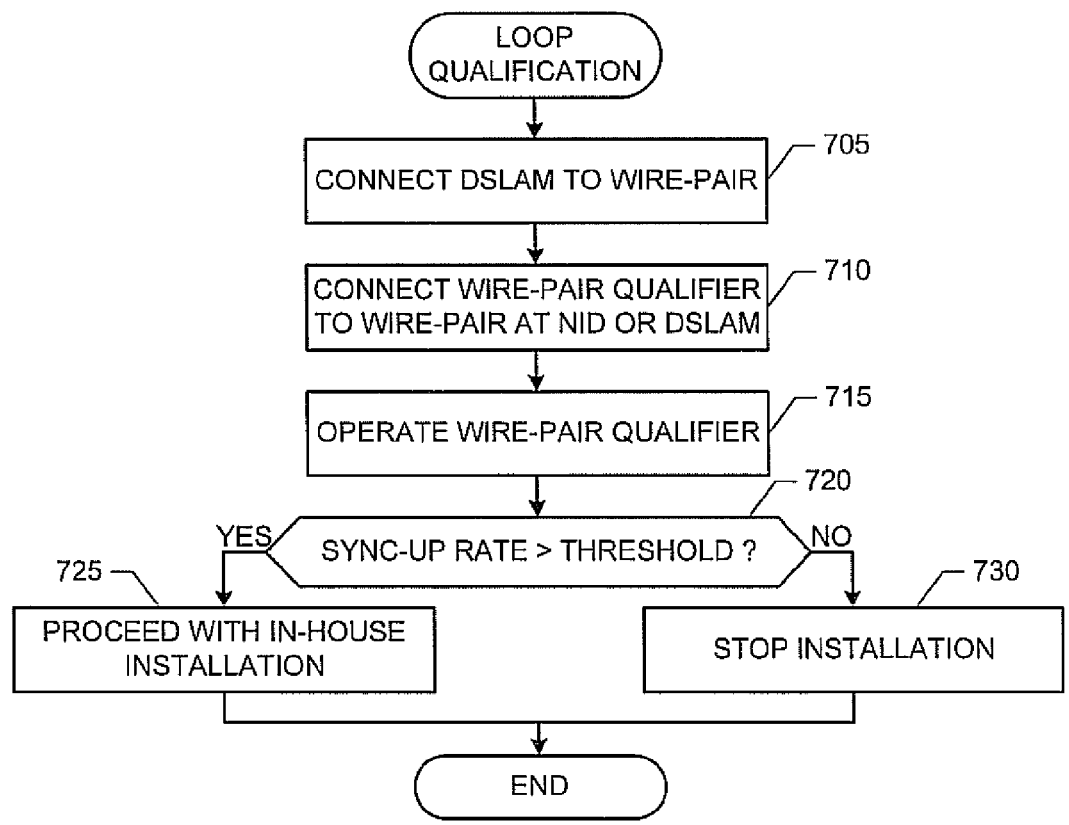
FIG. 7 is a flowchart representative of an example process that may be carried out to use and/or employ any or all of the example wire-pair qualifiers of FIGS. 1-4.
Figure 8:
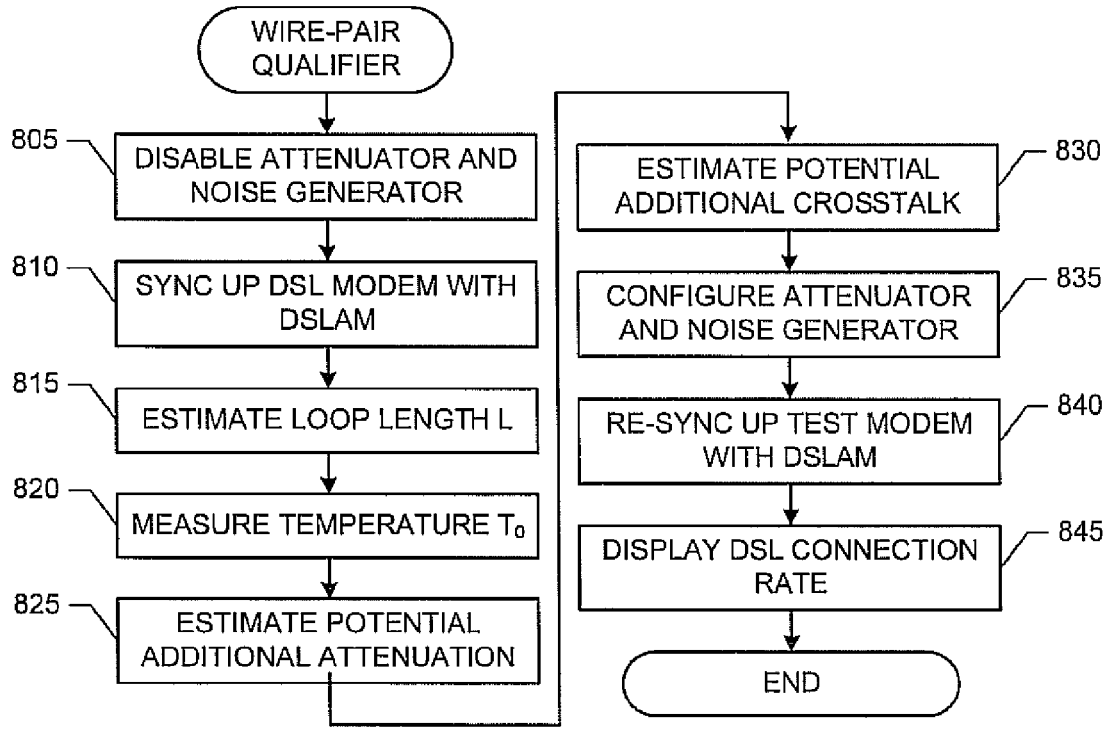
FIG. 8 is a flowchart representative of example machine accessible instructions which may be executed to implement any or all of the example wire-pair qualifiers of FIGS. 1-4.

FIG. 7 is a flowchart representative of an example process that may be carried out to qualify a wire-pair for a DSL service using any of the example wire-pair qualifiers 175 of FIGS. 1-4. FIG. 8 is a flowchart representative of example machine accessible instructions which may be executed to implement any or all of the example wire-pair qualifiers 175 of FIGS. 1-4. The example machine accessible instructions of FIG. 8 may be carried out by a processor, a controller and/or any other suitable processing device. For example, the example machine accessible instructions of FIG. 8 may be embodied in coded instructions stored on a tangible medium such as a flash memory, a ROM and/or RAM associated with a processor (e.g., the example processor 905 discussed below in connection with FIG. 9). Alternatively, some or all of the example machine accessible instructions of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIG. 8 may be implemented manually or as any combination of any of the foregoing techniques, for example, any combination of firmware, software, discrete logic and/or hardware. Further, although the example processes of FIGS. 7 and 8 are described with reference to the flowcharts of FIGS. 7 and 8, persons of ordinary skill in the art will readily appreciate that many other methods of implementing the processes of FIGS. 7 and 8 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIG. 8 may be carried out sequentially and/or carried out in parallel by, for example, separate processing threads, processors, devices, discrete logic, circuits, etc.

The example process of FIG. 7 begins with a person (e.g., the example field personnel 180 of FIG. 1) connecting a wire-pair (e.g., the example wire-pair 125) to a DSL modem (e.g., at the example DSLAM 115 or the customer-premises 110) (block 705). Like other blocks of this patent, this block may be omitted if the connection is already present. The same, or a different, person connects a wire-pair qualifier (e.g., any of the example wire-pair qualifiers 175 of FIGS. 1-4) to the wire-pair (e.g., at the example NID 135 or the DSLAM 115) (block 710). The person then operates the wire-pair qualifier to determine the DSL connection rate that the wire-pair can support under a particular set of environmental conditions (e.g., maximum ambient temperature and/or a particular number of other DSL modems creating crosstalk) (block 715).

If the DSL connection rate determined by the wire-pair qualifier meets or exceeds a threshold (e.g., the minimum DSL connection rate for a desired DSL service) (block 720), the same or a different person continues with the installation of a DSL modem (e.g., the example DSL modem 120 of FIG. 1) (block 725). If the DSL connection rate determined by the wire-pair qualifier does not meet the threshold (block 720), the installation of the DSL service for the wire-pair is terminated and/or is not initiated (block 730).

The example machine accessible instructions of FIG. 8 may be executed to implement any or all of the example wire-pair qualifiers 175 of FIGS. 1-4 to qualify a wire-pair pair for a desired DSL service. The example machine accessible instructions of FIG. 8 begin with a wire-pair qualifier (e.g., the example controller 410 of FIG. 4) disabling an attenuator (e.g., the example attenuator 425) and a noise generator (e.g., the example generator 435) so that the wire-pair qualifier can measure current environmental conditions (block 805). The controller then directs a DSL modem (e.g., the example DSL modem 405) to establish a DSL connection to a DSLAM (e.g., the example DSLAM 115 of FIG. 1) via the wire-pair (i.e., sync up) (block 810). Based upon one or more parameters measured and/or calculated by the DSL modem, the DSL modem and/or the controller estimates the length of the wire-pair (block 815). For example, the length of the wire-pair can be estimated by comparing the slope of a set of measured signal attenuation values to slopes for different loop lengths.

The controller (e.g., using the thermometer 420) then measures the current ambient temperature $T_o$ (block 820). Based upon a temperature to be emulated and the estimated loop length, the controller estimates the potential additional attenuation that may occur as the ambient temperature increases to the temperature to the emulated (block 825). For example, the mathematical expression of EQN (2) may be used to compute the additional attenuation. The additional crosstalk noise to be injected may be determined by computing a difference of the crosstalk noise measured by the DSL modem and a desired (e.g., worst-case) crosstalk noise calculated using EQN (1) (block 830).

The controller configures the attenuator and/or the noise generator to apply and/or inject the attenuation and/or the additional crosstalk noise determined at blocks 825 and 830 (block 835). The controller then directs the DSL modem to re-establish a DSL connection to a DSLAM via the wire-pair (i.e., sync up) (block 840). The controller then displays and/or otherwise provides the DSL connection rate under the emulated environmental conditions for the person operating the wire-pair qualifier (block 845). Control then exits from the example machine accessible instructions of FIG. 8.

Figure 9:
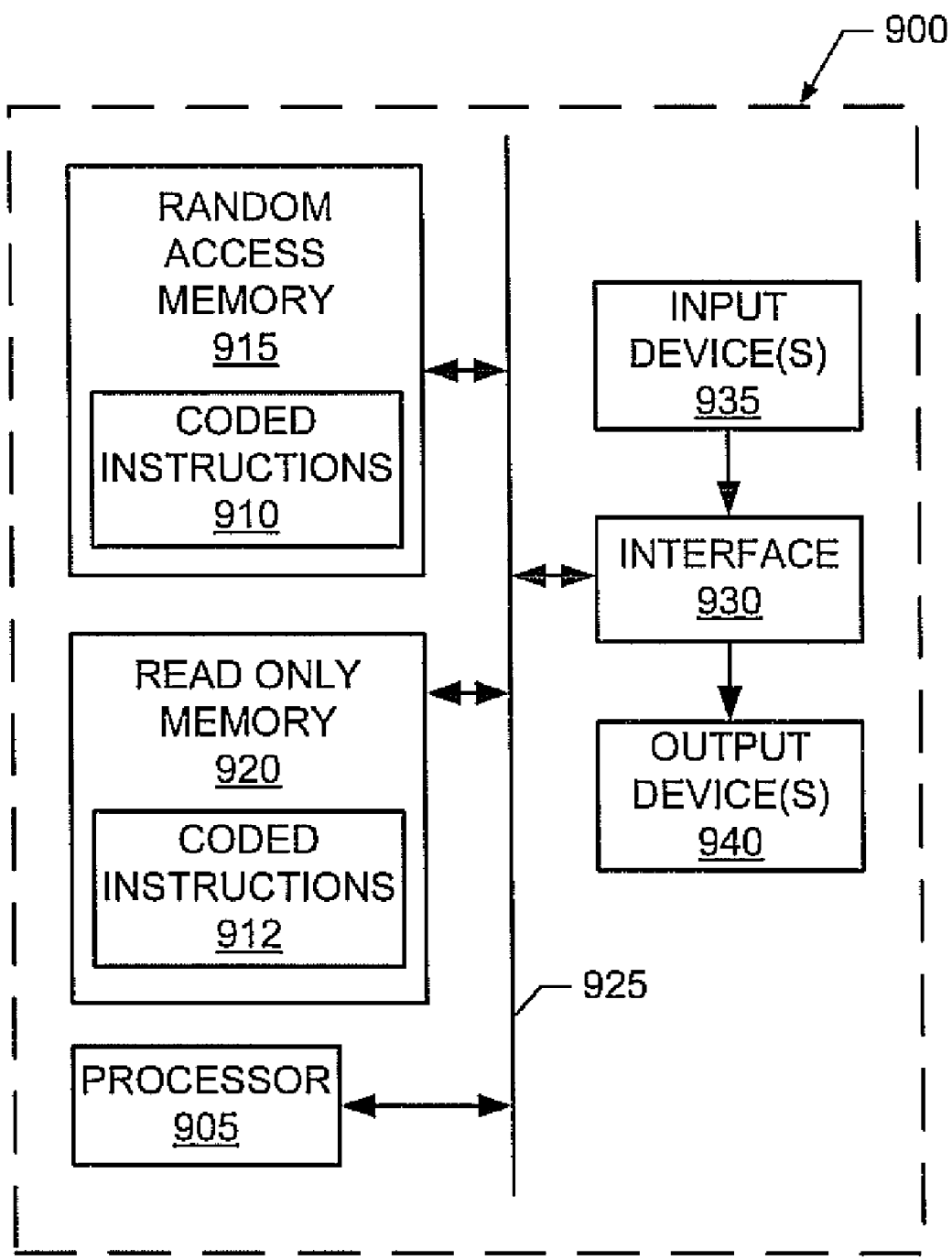
FIG. 9 is a schematic illustration of an example processor platform that may be used and/or programmed to execute the example machine accessible instructions of FIG. 8 to implement any or all of the example wire-pair qualifiers described herein.

FIG. 9 is a schematic diagram of an example processor platform 900 that may be used and/or programmed to implement any portion(s) and/or all of the example wire-pair qualifiers 175 of FIGS. 1-4. For example, the processor platform 900 can be implemented by one or more processors, processor cores, microcontrollers, DSPs, DSP cores, ARM processors, ARM cores, etc.

The processor platform 900 of the example of FIG. 9 includes at least one programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIG. 8 to implement any or all of the example wire-pair qualifiers described herein. The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown). The RAM 915 may be used to store and/or implement, for example, one or more values representative of a set of environmental conditions 155.

The processor platform 900 also includes an interface circuit 930. The interface circuit 930 may be implemented by any type of interface standard, such as a USB interface, a Bluetooth interface, an external memory interface, serial port, general purpose input/output, etc. One or more input devices 935 and one or more output devices 940 are connected to the interface circuit 930. The input devices 935 and/or output devices 940 may be used to implement the interface(s) 415 and/or to receive temperatures measured by the thermometer 420.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. For instance, DSL, POTS, VoIP, IP, Ethernet over Copper, fiber optic links, DSPs, ITU-T G.992.x, ITU-T G993.x represent examples of the current state of the art. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   modifying a digital subscriber line (DSL) signal received on a wire-pair at a DSL modem to emulate an environmental condition; and
   qualifying the wire-pair for a DSL service based on a DSL connection rate achieved by the DSL modem during the emulated environmental condition, wherein modifying the DSL signal comprises:
   estimating a length of the wire-pair;
   measuring an ambient temperature; and
   selecting an attenuation to be applied to the DSL signal based on the estimated length of the wire-pair and the ambient temperature.

2. A method as defined in claim 1, wherein modifying the DSL signal comprises attenuating the DSL signal.

3. A method as defined in claim 1, wherein estimating the length of the wire-pair comprises communicatively coupling the DSL modem to a second DSL modem via the wire-pair without modifying the DSL signal.

4. A method as defined in claim 1, wherein modifying the DSL signal comprises adding a noise to the DSL signal.

5. A method as defined in claim 4, wherein adding the noise comprises emulating a crosstalk noise.

6. A method comprising:
   modifying a digital subscriber line (DSL) signal received on a wire-pair at a DSL modem to emulate an environmental condition; and
   qualifying the wire-pair for a DSL service based on a DSL connection rate achieved by the DSL modem during the emulated environmental condition, wherein modifying the DSL signal comprises:
   adding a noise to the DSL signal;
   estimating a length of the wire-pair; and
   selecting the noise based on the estimated length of the wire-pair.

7. A method as defined in claim 6, wherein qualifying the wire-pair comprises:
   comparing the DSL connection rate to a threshold; and
   enabling the DSL service for the wire-pair based on the comparison.

8. A method as defined in claim 7, further comprising discontinuing the modification of the DSL signal before the DSL service is enabled for the wire-pair.

9. A method as defined in claim 7, wherein enabling the DSL service comprises enabling the DSL service at the connection rate achieved by the DSL modem during the emulated environmental condition.

10. A method as defined in claim 6, further comprising:
    comparing the DSL connection rate to a threshold; and
    disqualifying the DSL service for the wire-pair based on the comparison.

11. A method as defined in claim 6, wherein modifying the DSL signal is performed at an end of the wire-pair opposite from where the DSL modem is located.

12. A method as defined in claim 6, wherein the environmental condition comprises a temperature effect.

13. A method as defined in claim 6, wherein the environmental condition comprises a crosstalk effect.

14. A tangible article of manufacture excluding propagating signals and storing machine readable instructions that, when executed, cause a machine to:
    modify a digital subscriber line (DSL) signal received on a wire-pair at a DSL modem to emulate an environmental condition by:

estimating a length of the wire-pair;

measuring an ambient temperature; and selecting an attenuation to be applied to the DSL signal based on the estimated length of the wire-pair and the ambient temperature; and qualify the wire-pair for a DSL service based on a DSL connection rate achieved by the DSL modem during the emulated environmental condition.

15. An article of manufacture as defined in claim 14, wherein the machine accessible instructions, when executed, cause the machine to modify the DSL signal by attenuating the DSL signal.

16. An article of manufacture as defined in claim 14, wherein the machine accessible instructions, when executed, cause the machine to modify the DSL signal by adding a noise to the DSL signal.

17. An article of manufacture as defined in claim 14, wherein the machine accessible instructions, when executed, cause the machine to qualify the wire-pair by:

comparing the DSL connection rate to a threshold; and enabling the DSL service for the wire-pair based on the comparison.

18. An article of manufacture as defined in claim 17, wherein the machine accessible instructions, when executed, cause the machine to enable the DSL service by enabling the DSL service at the connection rate achieved by the DSL modem during the emulated environmental condition.

19. An article of manufacture as defined in claim 14, wherein the machine accessible instructions, when executed, cause the machine to:

compare the DSL connection rate to a threshold; and disqualify the DSL service for the wire-pair based on the comparison.

20. An article of manufacture as defined in claim 14, wherein the environmental condition comprises at least one of a temperature effect or a crosstalk effect.

21. An apparatus comprising:

an environment emulator to emulate an environmental condition, the environment emulator comprising a noise generator to generate a noise signal and an adder to add the noise signal to the input signal; and a digital subscriber line (DSL) modem to be communicatively coupled to a wire-pair via the environmental emulator to detect a DSL connection rate to qualify the wire-pair for a DSL service, wherein the DSL modem is to estimate a length of the wire-pair, and the environment emulator is to control the noise generator based on the estimated length.

22. An apparatus as defined in claim 21, further comprising a controller to control the modification of the input signal and to direct the DSL modem to measure the DSL connection rate.

23. An apparatus as defined in claim 21, wherein the environment emulator comprises a signal attenuator to be in circuit with the wire-pair and the input of the DSL modem.

24. An apparatus as defined in claim 21, further comprising a housing, wherein the DSL modem and the environment emulator are located within the housing.

25. An apparatus as defined in claim 21, further comprising an interface to initiate operation of the environment emulator and the DSL modem, and to display the DSL connection rate.

26. An apparatus comprising an environment emulator to emulate an environmental condition;

a digital subscriber line (DSL) modem to be communicatively coupled to a wire-pair via the environmental emulator to detect a DSL connection rate to qualify the wire-pair for a DSL service, the environment emulator comprising a signal attenuator to be in circuit with the wire-pair and the input of the DSL modem; and a thermometer to measure an ambient temperature, wherein the environment emulator is to control the attenuator based on the ambient temperature and an estimated wire-path length.

27. An apparatus as defined in claim 23, wherein the environment emulator comprises:

a noise generator to generate a noise signal; and an adder to add the noise signal to the input signal.

* * * * *